United States Patent
Morales et al.

(10) Patent No.: US 12,190,000 B2
(45) Date of Patent: Jan. 7, 2025

(54) METHODS FOR PRINT INSPECTION RECOVERY OPERATIONS AT A PRINTING DEVICE

(71) Applicant: Kyocera Document Solutions Inc., Osaka (JP)

(72) Inventors: Javier A. Morales, Rochester, NY (US); Yoshihiro Osada, Torrance, CA (US)

(73) Assignee: Kyocera Document Solutions Inc., Osaka (JP)

( * ) Notice: Subject to any disclaimer, the term of this patent is extended or adjusted under 35 U.S.C. 154(b) by 246 days.

(21) Appl. No.: 17/874,628

(22) Filed: Jul. 27, 2022

(65) Prior Publication Data

US 2024/0035984 A1 Feb. 1, 2024

(51) Int. Cl.
*G06F 3/12* (2006.01)
*H04N 1/34* (2006.01)

(52) U.S. Cl.
CPC ............ *G06F 3/121* (2013.01); *G06F 3/1234* (2013.01); *G06F 3/1237* (2013.01); *G06F 3/1282* (2013.01); *H04N 1/346* (2013.01)

(58) Field of Classification Search
CPC ...... G06F 3/121; G06F 3/1234; G06F 3/1237; G06F 3/1282; H04N 1/346
See application file for complete search history.

(56) References Cited

U.S. PATENT DOCUMENTS

| | | | |
|---|---|---|---|
| 10,379,791 B2 | 8/2019 | Fukuda | |
| 2015/0131116 A1 | 5/2015 | Sochi | |
| 2021/0255815 A1* | 8/2021 | Kawaguchi | ........ G06Q 30/0283 |
| 2023/0033817 A1* | 2/2023 | Eda | ........ G06F 3/1284 |
| 2023/0333505 A1* | 10/2023 | Igarashi | ........ G03G 15/5062 |

* cited by examiner

*Primary Examiner* — John R Wallace
(74) *Attorney, Agent, or Firm* — Millen, White, Zelano & Branigan P.C.; William F. Nixon

(57) ABSTRACT

A printing device includes an inspection system that uses variable intervals to inspect printed sheets for a print job. The variable interval sets the inspection points for the inspection process. Once a defect is detected on a printed sheet, the sheets in the paper path are cleared and separated into good and defective sets of sheets. The cleared sheets are sent to an output bin for further review. After addressing the defect, the last good sheet printed is determined and adjusted to resume printing operations.

16 Claims, 8 Drawing Sheets

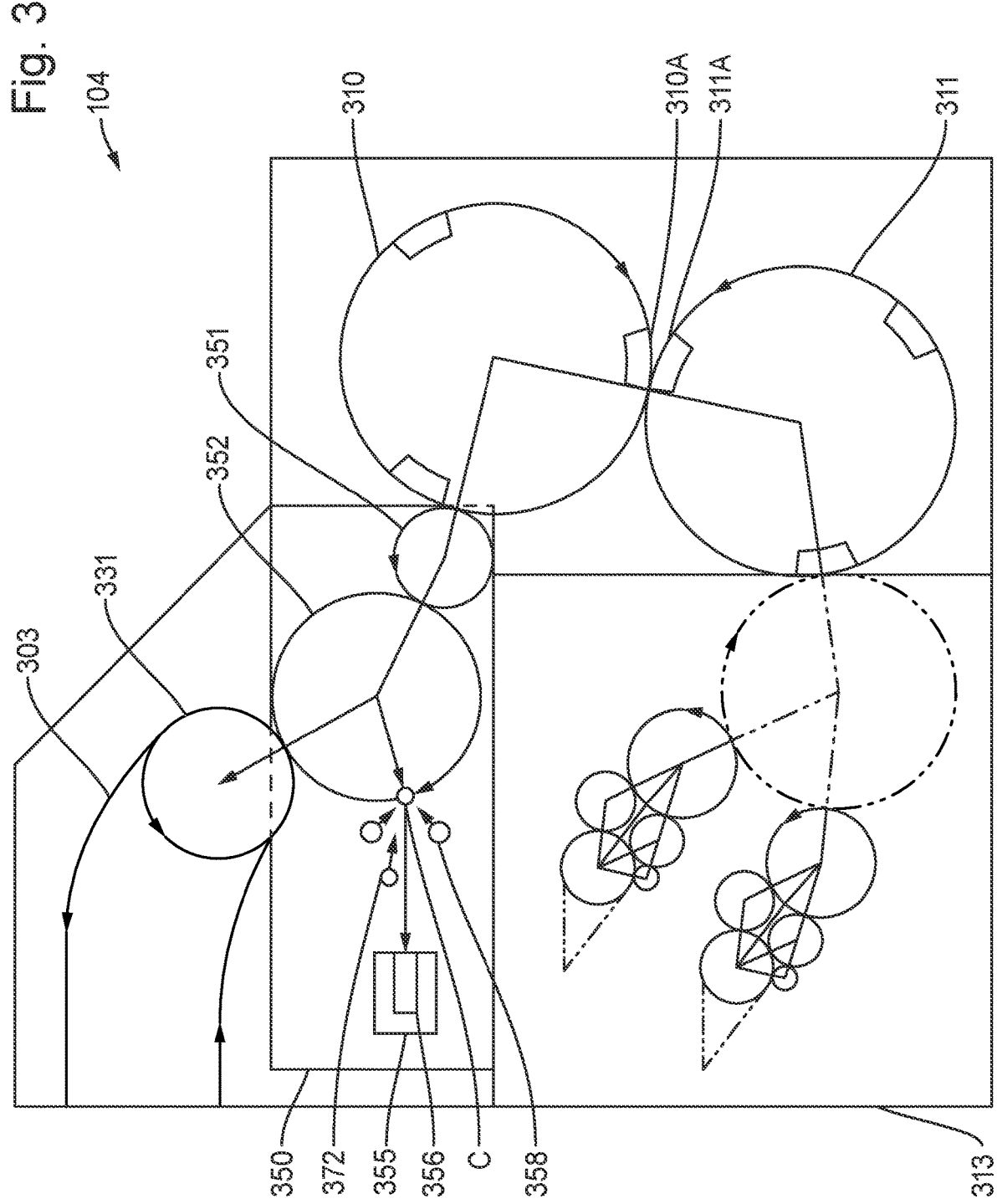

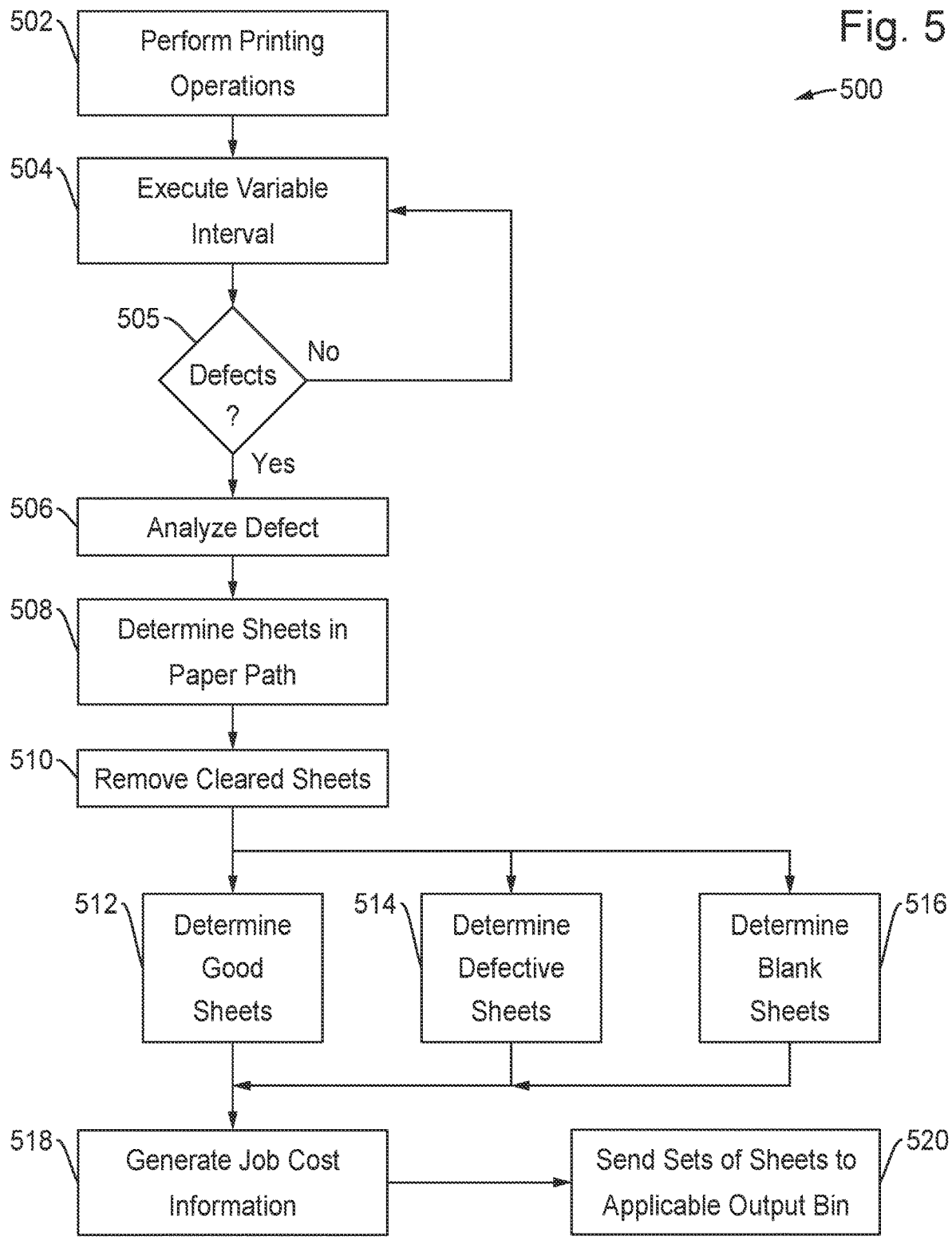

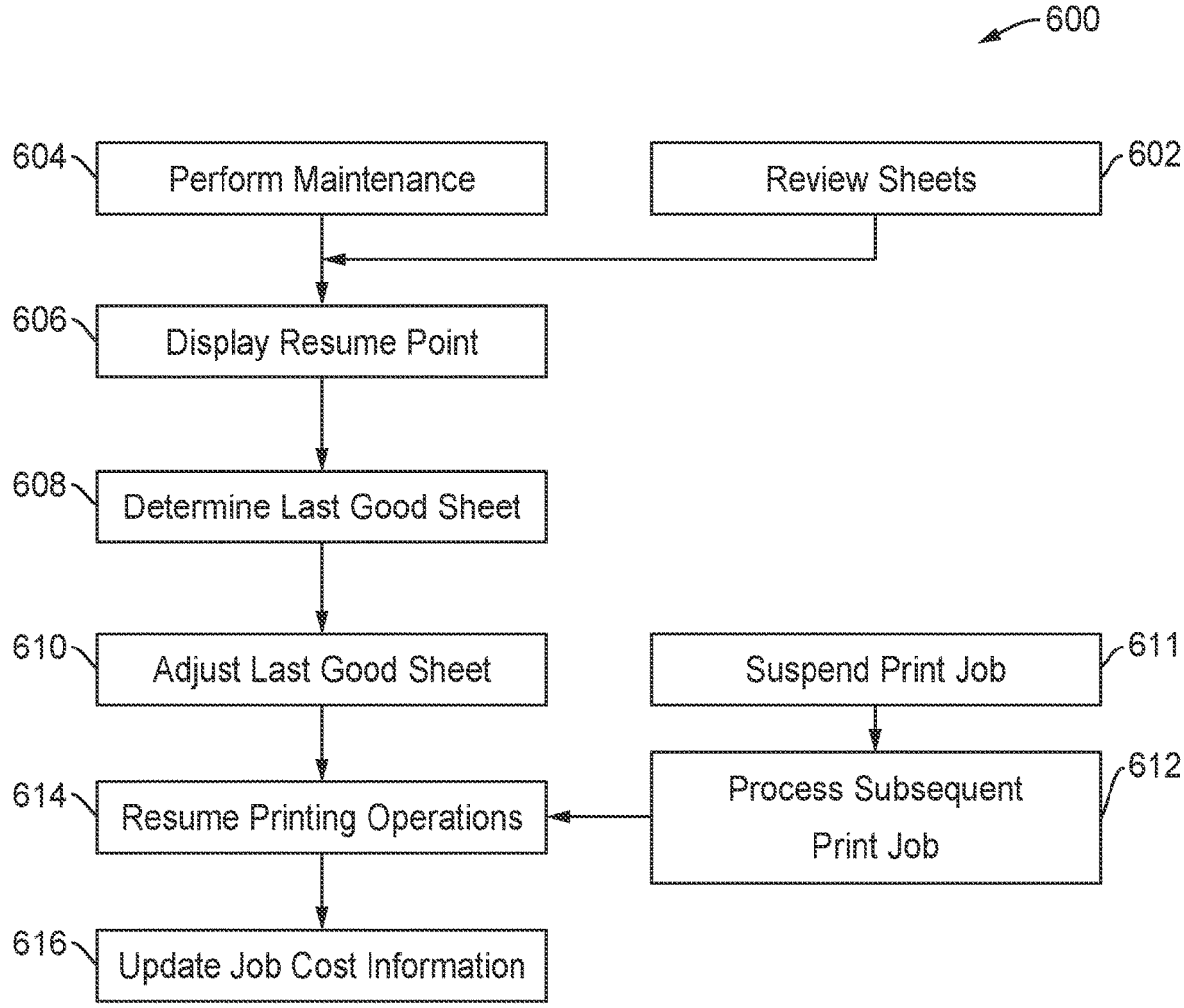

METHODS FOR PRINT INSPECTION RECOVERY OPERATIONS AT A PRINTING DEVICE

FIELD OF THE INVENTION

The present invention relates to a printing system and associated methods to conduct print inspection recovery operations. More particularly, the present invention relates to generating job cost information and performing additional actions for a print inspection recovery operation.

DESCRIPTION OF THE RELATED ART

Modern production printing device often include inline inspection functionality. The functionality involves scanning printed sheets at specified intervals and either stopping printing, or, if possible, compensating for defects. For example, a printing device may compensate for inkjet printhead jet outs by jetting additional ink from nozzles around a defective nozzle. In either case, inspection that involves evaluating printed output cannot be done at engine speed. For this reason, inspection is done at user-configurable intervals with the smallest possible interval reflecting how long it takes to inspect the scanned image. Defects will go undetected until the inspection interval is reached and when the scanned sheet is evaluated. In many instances, it is not possible to prevent a printing operation of potentially unacceptable output.

Further, some instances include cases in which defects are unacceptable. In these cases, the print shop must stop printing when a defect is found. The operator must then evaluate the printed output and determine which sheets must be reprinted. Reprinting operations can be difficult for large print jobs, such as jobs with tens of thousands of pages as the operator typically needs to know the exact pages to reprint.

SUMMARY OF THE INVENTION

A method for print inspection recovery operations is disclosed. The method includes detecting a defect on a scanned sheet of a print job being printed within a printing device. The scanned sheet is inspected within a variable interval. The method also includes determining a number of sheets within a paper path of the printing device based on the scanned sheet. The method also includes removing the number of sheets from the paper path. The method also includes determining a set of defective sheets within the number of sheets. The method also includes generating job cost information for the set of defective sheets.

A method for print inspection recovery operations is disclosed. The method includes detecting a defect on a scanned sheet of a print job being printed within a printing device. The scanned sheet is inspected within a variable interval. The method also includes determining a number of sheets within a paper path of the printing device based on the scanned sheet. The method also includes identifying the number of sheets from the paper path. The method also includes determining a set of defective sheets within the number of sheets. The method also includes determining a set of good sheets within the number of sheets. The method also includes sending the set of defective sheets to a first output bin of the printing device. The method also includes sending the set of good sheets to a second output bin of the printing device.

A method for recovering from an equipment malfunction defect at a printing device. The method includes detecting a defect on a scanned sheet of a print job being printed within a printing device. The scanned sheet is inspected within a variable interval. The method also includes determining a number of sheets within a paper path of the printing device based on the scanned sheet. The method also includes removing the number of sheets from the paper path. The method also includes determining a set of defective sheets within the number of sheets. The method also includes adjusting a first sheet of the set of defective sheets using a user interface at the printing device. The method also includes resuming printing of the print job at the first sheet.

BRIEF DESCRIPTION OF THE DRAWINGS

Various other features and attendant advantages of the present invention will be more fully appreciated when considered in conjunction with the accompanying drawings.

FIG. 3 illustrates a schematic partial side view of the printing device equipped with an inline inspection system according to the disclosed embodiments.

FIG. 5 illustrates a flowchart for enhanced print inspection recovery according to the disclosed embodiments.

FIG. 6 illustrates a flowchart for adjusting a resume point during inspection recovery operations according to the disclosed embodiments.

DETAILED DESCRIPTION OF THE PREFERRED EMBODIMENTS

Figure 1A:
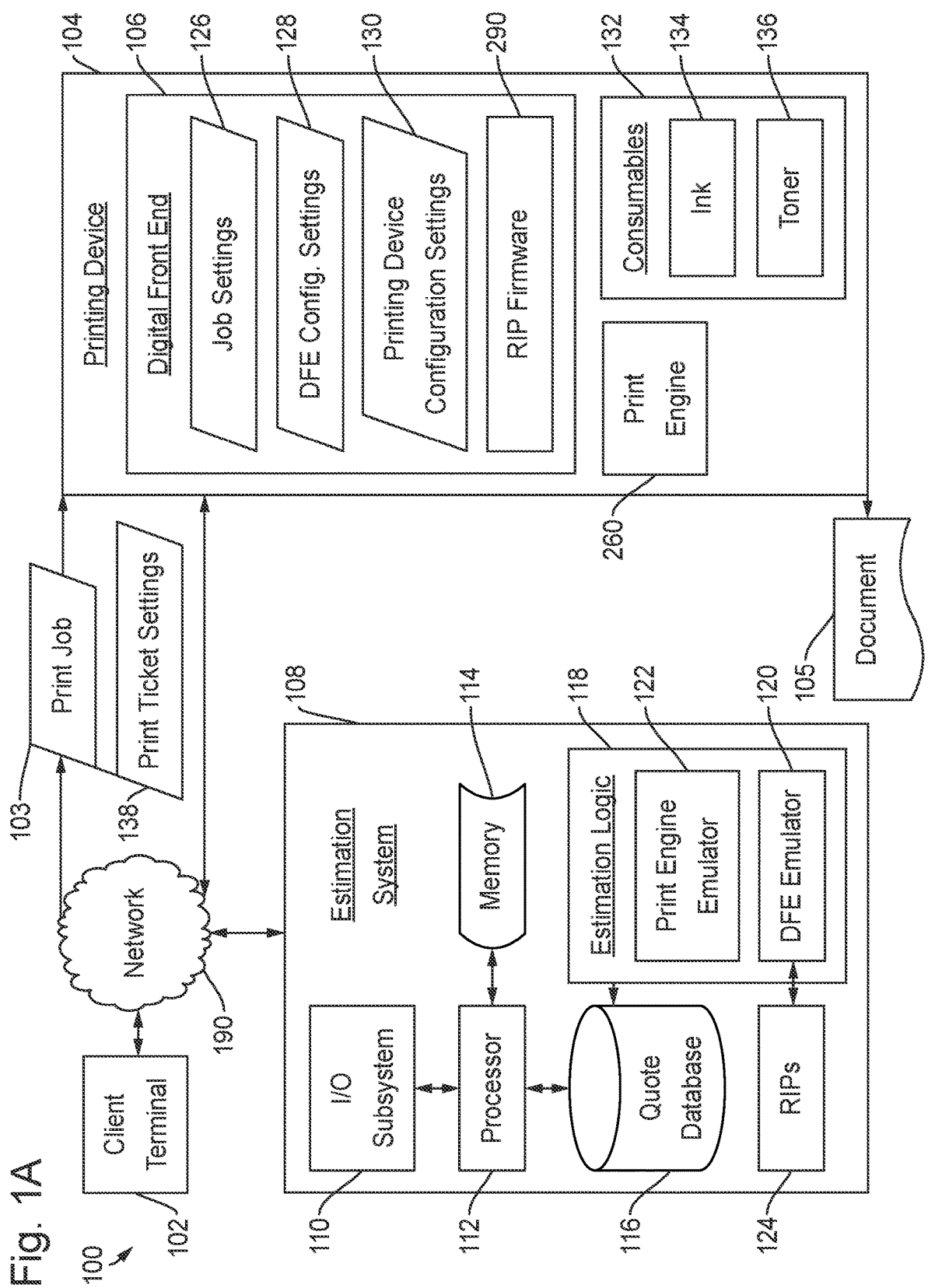
FIG. 1A illustrates a printing system for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide an enhanced job resumption system that improves the usability of recovering from errors detected by inline inspection systems. A printing device may include an inline inspection system that performs inline image inspection in a normal manner. The inline inspection system scans printed sheets at the specified intervals. The inline inspection system evaluates the scanned image to look for print defects. When a defect is found, the inline inspection system either compensates or stops printing operations, based on the inspection system configuration.

If the inspection system is configured to stop printing, then the printing device will pause printing after it finds a defect in a scanned sheet. The printing device will then return as status letting the operator know that he/she needs to inspect the output. This message may be shown in the printing device panel on in the digital front end (DFE) user interface (UI). Alternatively, it may be sent to any clients displaying printing device status. The printing device then will stop feeding and clears out the paper path by sending all sheets to the stacker. For sheets that have been fed but not printed, the printing device optionally may send these to the output bin without printing on them.

Once the paper path is cleared, the printing device will report job cost information. Sheets before the defective sheet will be reported as good, or acceptable. Sheets after the defective sheet will be reported as waste. The printing device will report relevant job cost information at any time that job cost information is reported. This job cost information may include the sheets used, impressions printed, and consumables used. Sheets that were fed but do not have anything printed thereon will be reported as "blank impressions." Consumables may refer to ink or toner usage.

The printing device also may lower the output bin so that the operator can quickly remove the paper stack from the printing device. The printing device also lets the DFE know the impression on which the defect is found. The DFE, will do the following actions. The DFE will suspend the active job and flag it as requiring input from the operator before printing resumes. The DFE also adjusts the page range for the print job so that it resumes printing from the impression on which the defect is found.

Once the printing device stops printing, the operator may perform maintenance routine to unclog the printhead. The printing device will report job cost information for printing done to unclog print heads, such as sheets, impressions, and ink or toner. The printing device also will report print head cleaning, usually a consumable such as ink or toner. The above actions may be taken multiple times until the head is cleared. Once the printing device exits maintenance, the DFE will aggregate job cost information from the maintenance operations and track that as separate job cost data. This feature may be implemented and performed within the printing device.

After successful maintenance, the printing device will resume normal printing operations. The suspended job will resume printing. The print job, however, will not automatically start printing. Instead, the DFE will show a user interface where the operator can review and adjust the resumption point. This will be set to the page where the defect was detected. The user interface also will prompt the operator to review the output stack to determine the last good sheet. This sheet may be different versus the page on which the defect was detected because the inspection system does not check every page.

Once the operator inspects the stack and determines the last good sheet, the operator can adjust the resume point via one of the following methods. For example, the user interface will show the operator a preview of the page that will print next and of the pages before and after this page. The operator may scroll back to previous pages until he/she finds the first bad page. The operator can select the preview to adjust the page from which to resume printing. The operator also may specify the number of bad sets in the stack. This method is best for print jobs with a small number of pages, such as printing 100 copies of a 40 pages brochure.

Another method for adjusting the resume point includes the user interface allowing the operator to specify the number of bad sheets on the stack. The user interface will adjust the previews to show the impression on the front of the first bad sheet. Because this feature may take some time for long print jobs, the operator optionally may suspend printing operations for the print job so that other print jobs are processed while one determines the page from which to resume printing. This feature may be best for transactional jobs for which integrity is critical and for which minimizing waste sheets is important, such as printing credit card statements.

If either jogging or slip sheets are enabled for the print job, then the user interface also may allow the operator to specify the number of bad segments. Jogging may refer to the shift offset of papers. The user interface will adjust the previews to show the front of the first sheet on the first bad segment. A segment may be defined as all the sheets within an offset block or all the sheets between two slip sheets. Because the operator need only count segments, he/she quickly can find the resumption point. This feature may be best for long jobs for which the amount of waste is not critical, such as printing personalized marketing mailers. In all cases, the operator may use the sheet preview to validate that he/she are resuming the print job at the expected location.

Once the operator adjusts the resumption point, the print job will resume printing normally. The DFE will adjust the good versus the waste job cost information based on how the resume page is adjusted. Once the print job completes, the printing device will report job cost information for the resumed portion of the print job. The DFE will aggregate this information with the previous job cost information and store the combined information for the print job.

The disclosed embodiments alleviate the need to inspect every sheet that is printed at the printing device, which, in turn lowers costs for printing operations. When defects do occur, the disclosed embodiments provide methods to identify when the defect occurred and resume printing operations. As defects should occur rarely, the time and additional costs associated with correcting the defect will be offset by the increase in print production and less resources used to perform constant inspections.

FIG. 1A depicts a printing system 100 for printing documents using printing device 104 according to the disclosed embodiments. Printing system 100 may be located in a print shop or other environment suitable for production printing operations. Printing system 100 includes one or more printing devices 104 that receive print jobs from one or more client terminals 102.

Printing device 104 receives print jobs through printing system 100, such as print job 103. After processing print job 103, printing device 104 prints or produces document 105 in a paper or media specified by the print job. Printing device 104 is disclosed in greater detail in FIG. 2. Printing device 104 also includes digital front end (DFE) 106, which facilitates processing print job 103. DFE 106 may be disclosed in greater detail in FIG. 1B. In addition to the components of DFE 106 disclosed in FIG. 1B, it also includes various settings that may be of use for consumable use estimation, such as ink or toner use. This information includes job settings 126, DFE configuration settings 128, and printing device configuration settings 130. DFE 106 also includes RIP firmware 290, disclosed in greater detail below.

Printing device 104 also includes consumables 132. Consumables 132 may relate to items at or within printing device 104 but are not actually part of the printing device itself. Consumables 132, however, are used in printing operations. Consumables 132 include ink 134 and toner 136. Ink 134 and toner 136 further may be broken into different colorant inks. For example, ink 134 may include cyan ink, magenta ink, yellow ink, and black ink. If printing device 104 is not capable of color printing, then ink 134 may include only black ink. Printing device 104 may include other consumables 132, such as sheets, that are not disclosed in detail herein.

Print job 103, when printed on printing device 104, uses an amount of consumables 132 to produce document 105. In some embodiments, print job 103 produces thousands or more of a document. Thus, the amount of consumables used for print job 103 may be considerable. As disclosed above, printing system 100 may need to provide an estimate for the use of consumable 132. The estimate determined for print job 103 may depend on various settings of printing device 104. The settings as well as print ticket settings 138 associated with print job 103 impact the amount of consumables 132 used to generate document 105.

For example, DFE 106 may use RIP firmware 290 to convert bitmap images, vector graphics, fonts, and the like associated with pages in print job 103 to bitmap/rasterized representations of the pages, such as C, M, Y, and K pixels. The sum of the values of pixels of a particular color in the rasterized pages can be proportional to the amount of consumables 132 used by printing device 104 to print that color. RIP firmware 290 may rasterize pages of print job 103 according to various image rasterization settings, as captured by DFE configuration settings 128. For example, these image rasterization parameters may include calibration curves, paper definitions, ICC profiles, spot color definitions, TRCs, color conversion settings, colorant limits for ink or toner, rendering intent, K preservation, CGR level, max colorant densities, print margins, halftones, and the like.

Print engine 260 also is included with printing device 104. Printing device 104 may correspond to an industrial printing device capable of printing thousands of pages in an hour. Printing device 104 may be ink-based, toner-based, or both. Print engine 260 may include various parameters, shown as printing device configuration settings 130, that can control the operation of printing device 104, which impacts the amount of consumables 132 required by the printing device. For example, these settings may include printing device maintenance settings that control or effect head cleaning intervals, head clogging prevention intervals, and the like of printing device 104. Printing device configuration settings 130 also may include spitting, or printing spray pattern over all content, the printing of purge sheets, the printing of spit lines, or lines printed between page frames in a roll-fed printing device to ensure that all jets of the print head fire when instructed.

To lower printing device consumable usage, RIP firmware 290 may be configured via image rasterization parameters of DFE configuration settings 128 to reduce the density for each colorant, convert color images to black and white, and adjust tone reproduction curves (TRCs) to lower printing device use of consumables 132. Gray component replacement levels may be adjusted via DFE configuration settings 128.

The disclosed embodiments also include an estimation system 108 that includes estimation logic to facilitate performance of ink use estimation. Estimation system 108 may include estimation logic 118 having a DFE emulator 120 and a print engine emulator 122 configured to emulate operations performed by DFE 106 and print engine 260 of printing device 104. Print engine 260 is disclosed in greater detail below. DFE, emulator 120 and print engine emulator 122 may be configured with job settings 126, DFE configuration settings 128, and printing device configuration settings 130 to match settings associated with printing device 104. Estimation logic 118 also may be configured to estimate the amount of consumables 132 to process print job 103 and produce document 105.

In operation, estimation logic 118 may monitor information and settings of printing device 104 to determine any differences from previous estimates. This feature facilitates real-time configuration information for DFE 106, RIP firmware 290, or print engine 260 with the corresponding settings utilized by printing device 104.

Estimation system 108 may be any device within system 100 and connected to network 190 to receive and send data to printing device 104. Estimation system 108 also may be connected to other printing devices within system 100. Preferably, estimation system 108 is a server. It also may be another device, such as a computer. Estimation system 108 includes a memory 114 and a processor 112. Estimation system 108 also includes an input/output (I/O) subsystem 110 and a quote database 116.

Estimation system 108 also may refer to consumable estimation software that executes on a device. As disclosed below, "offline estimation device" may refer to this software. The term "offline" may refer to the fact that estimation system 108 is not part of printing device 104, or an "inline" component of the printing process.

Processor 112 is in communication with memory 114. Processor 112 is configured to execute instruction code in memory 114. The instruction code controls offline estimation device 108 to perform various operations for estimating consumables 132 that may be used by printing device 104. Processor 112 may be a computer processing unit that executes the instruction code in memory 114.

I/O subsystem 110 may include one or more input, output, or input/output interfaces that are configured to facilitate communications with other devices within system 100, such as client terminal 102 and printing device 104. An example of I/O subsystem 110 may be configured to dynamically determine the communication methodology utilized by entities of system 100 to communication information thereto. For example, I/O subsystem 110 may determine that a first entity utilizes a RESTful API and can, as a result, communicate with the entity using an interface that uses a RESTful communication methodology.

Estimation logic 118 is implemented within offline estimation device 108 to estimate the amount of consumables 132 to be used by printing device 104 for printing document 105 of print job 103. Estimation logic 118 includes DFE emulator 120 and print engine emulator 122, as disclosed above. DFE emulator 120 and print engine emulator 122 are configured with configuration setting information to match the settings and parameters of printing device 104.

DFE emulator 120 may be configured to emulate operations performed by DFE 106 of printing device 104. The emulation depends on various settings specified for printing device 104. For example, DFE emulator 120 may be configured to convert bitmap images, vector graphics, fonts, and the like specified in sample pages of print job 103 to bitmap/rasterized representations of the pages using C, M, Y, and K pixels. The manner in which DFE emulator 120 performs the conversion may depend on various image rasterization settings of the DFE emulator, which correspond to the image rasterization settings of DFE 106.

In some embodiments, DFE emulator 120 retrieves a RIP of the plurality of Rips 124 available at estimation system 108. Selection of the appropriate RIP provides a better basis to estimate ink use. For example, estimation logic 118 may determine the DFE, software version for DFE, 106 to select a RIP that has the same version. Estimation system 108 includes many different RIPs 124. Preferably, it includes one for each software version that has been released. DFE emulator 120 may automatically configure the selected RIP using configuration settings from information retrieved from DFE 106.

Print engine emulator 122 may be configured to emulate operations performed by print engine 260 or printing device 104. The emulation may depend on various printing device configuration settings 130 for printing device 104.

Estimates provided using estimation logic 118 of estimation system 108 may be stored as a record or entry in quote database 116. Each entry to quote database 116 may specify aspects associated with an estimate provided to a customer for processing a particular print job 103. Each entry may include field for job settings 126, DFE configuration settings 128, and printing device configuration settings 130 used to provide the estimate as well as a consumables estimate field and a cost field. Other information may be provided such as a client information field, a job information field, or a unique identification (ID) field. Preferably, print job 103 is a recurring printing operation in that multiple instances will occur that involves the printing of document 105.

Figure 1B:
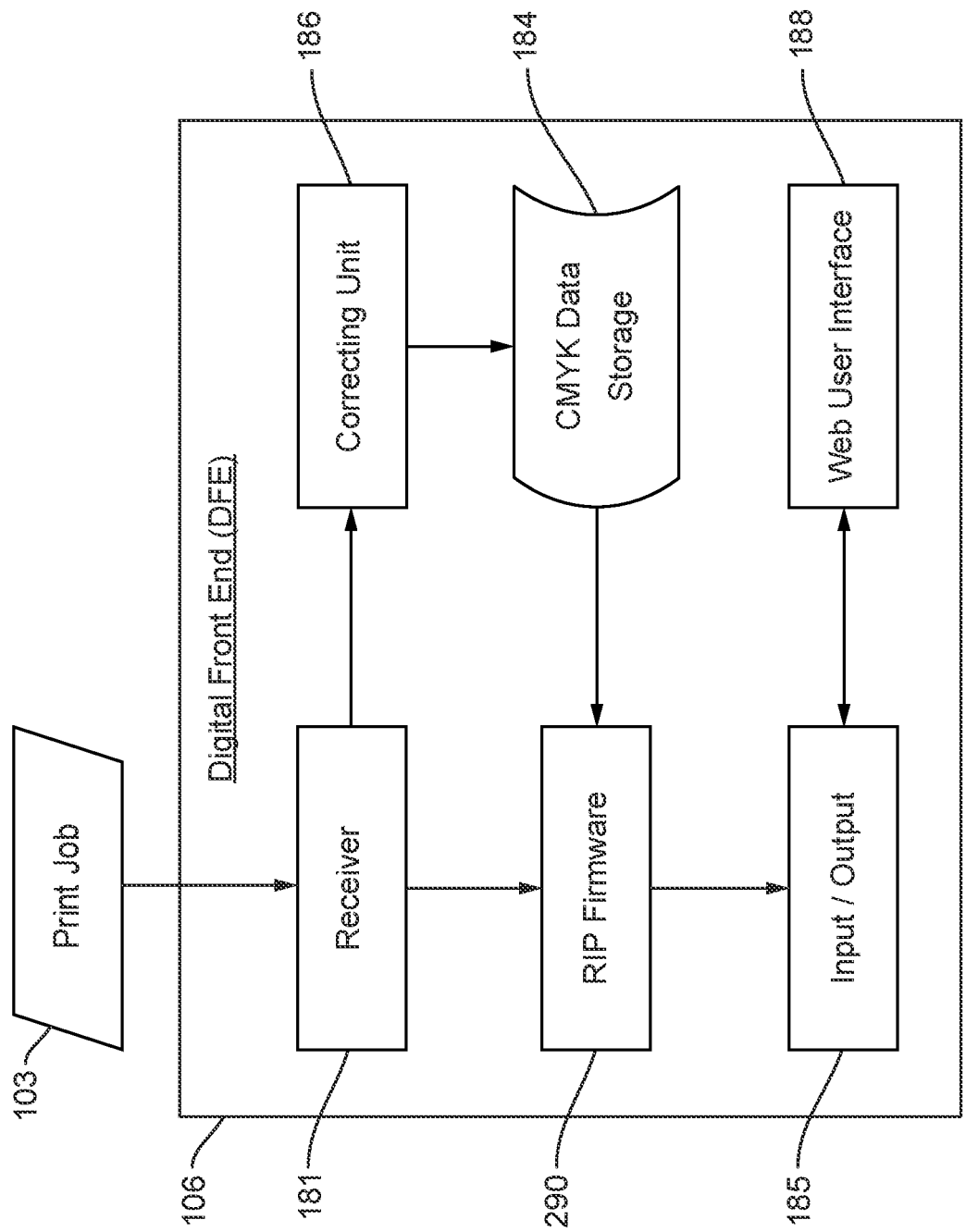
FIG. 1B illustrates a digital front end (DFE) for a printing device according to the disclosed embodiments.

FIG. 1B depicts a block diagram of DFE 106 according to the disclosed embodiments. DFE 106 includes a receiver 181, an RIP firmware 290, a CMYK data storage 184, an input/output connector 185, and a correcting unit 186. RIP firmware 290 also is disclosed in FIG. 2 and in greater detail in FIG. 3. Additional components within DFE 106 may be implemented, including those disclosed in FIG. 1A. DFE 106, therefore, includes data for job settings 126, DFE configuration settings 128, and, optionally, printing device configuration settings 130, even though these are not shown in FIG. 1B.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided by printing device 104 alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with other printing devices or estimation system 108, if it is located at a separate device, using, for example, input/output connector 185. Web user interface 188, or web application, allows a user of the DFEs of other printing devices to interact with content or software running on DFE 106.

Figure 2:
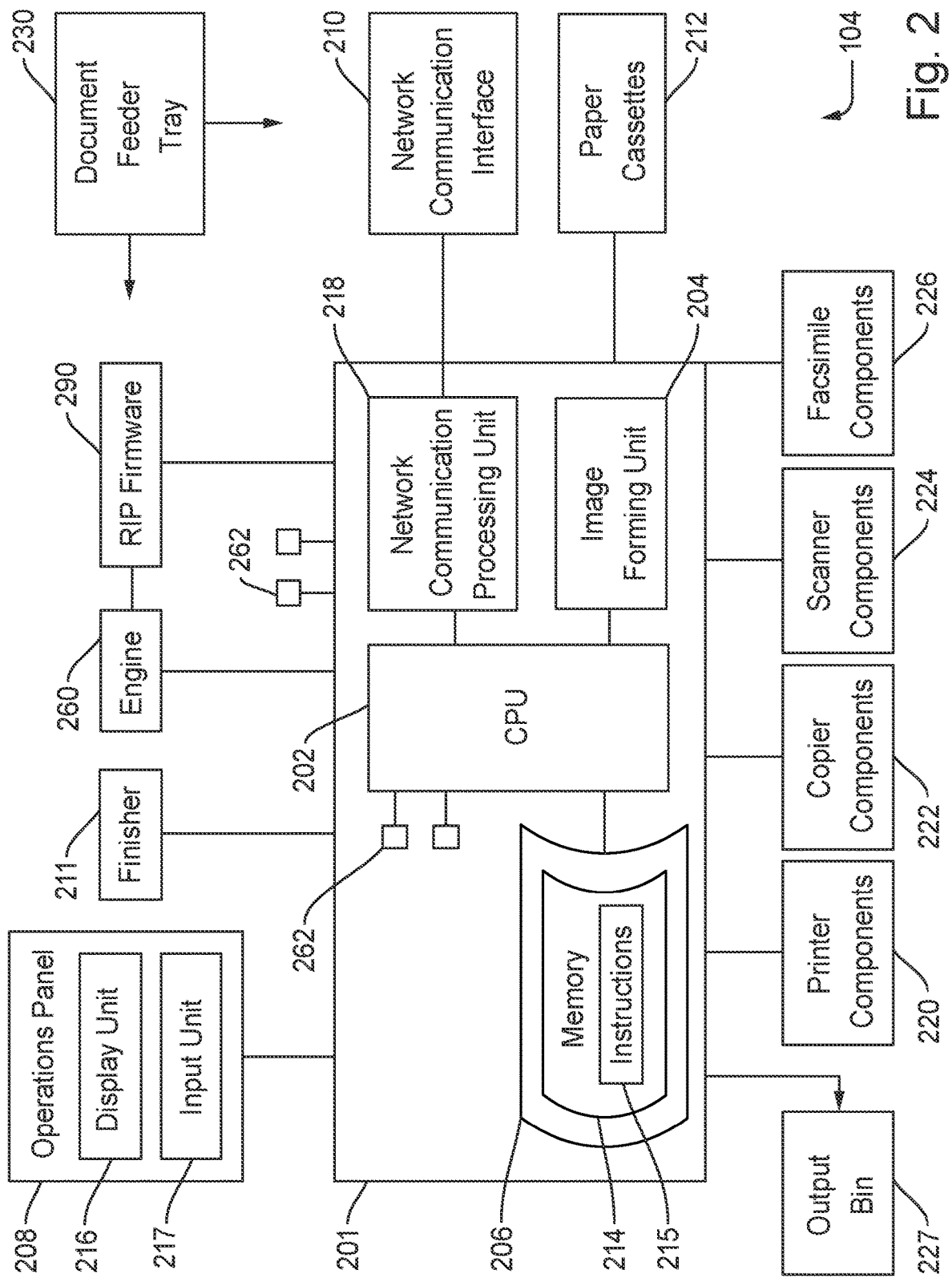
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from estimation system 108, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from offline estimation device 108, if applicable. Estimation system 108 may send ink use estimation data to printing device 104 for display. For example, the operator at printing device 104 may request an estimate for a received print job 103. Printing device 104 requests an estimate for consumables 132 according to the disclosed embodiments.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from estimation system 108 as well as other printing devices within system 100.

FIG. 3 depicts a schematic partial side view of printing device 104 equipped with an inline inspection system 350 according to the disclosed embodiments. Various components and features of printing device 104 not disclosed in FIG. 2 are illustrated in FIG. 3. FIG. 3 shows an impression cylinder 310 as well as an upper portion of printing cylinder 311 and inking system, or color-selector cylinders 313.

Sheets are fed in succession to impression cylinder 310. Impression cylinder 310 may rotate in the clockwise direction in FIG. 3 and transports each sheet in succession past the printing nip formed between impression cylinder 310 and printing cylinder 311. Once printed, the sheets are taken away from impression cylinder 310 by a suitable sheet conveyor system 303 for delivery to a sheet delivery station having multiple delivery piles. Sheet conveyor system 303 includes a chain gripper system having, for example, two endless chains supporting a plurality of spaced-apart gripper bars for holding the printed sheets by a leading edge thereof, which endless chains are driven along a delivery path between two pairs of chain wheels, including chain wheel 331.

Inspection system 350 provides inline inspection of the sheets being processed in printing device 104. Inspection system 350 includes an optical quality control apparatus for performing inspection of a printed area on a printed side of the sheets. The optical quality control apparatus may be coupled to an image processing unit, such as housed within DFE 106 for processing the images captured by the optical quality control apparatus. FIG. 3 shows an example inspection system 350.

The optical quality control apparatus includes camera system 355 with one or more camera units, each comprising at least one line-scan camera 356 for scanning and capturing an image of the printed area while the sheet is being transported in printing device 104 past camera system 355. Preferably, camera system 355 includes a single camera unit that is disposed transversely to the path of the sheets for scanning an entire width of the printed area of the sheets. Such camera unit may include one or more line-scan cameras 356 aligned transversely to the path of the sheets. A single line-scan camera 356 may be used as long as it can see the whole width of the printed area to be inspected. Depending on practical constraints, it may be desirable to provide two or more cameras 356 for scanning the entire width of the printed area, each camera scanning a corresponding section of the width of the printed area.

An illumination unit 358 is provided to suitably illuminate the portion of the printed area that is inspected by means of camera system 355. In this example, two lighting sources may be provided on each side of the optical path of camera system 355 in order to illuminate the desired portion of the printed areas along two different angles. An adjustable blowing device 372, such as a blowing pipe, may be provided at the inspection location C in FIG. 3 in order to blow air against the portion of the printed sheet being inspected.

The location of the one or more line-scan cameras 356 in printing device 104 press along the delivery path of the sheets, such as the path of the sheets running from the printing group to the delivery station, is selected in such a way that cyclical vibrations that spread periodically throughout printing device 104 during printing operations do not occur while camera system 355 is scanning the printed area of the sheet and capturing a complete image of the printed area. Vibrations may occur as a result of the passage of cylinder pits 310a and 311a of impression cylinder 310 and printing cylinder 311. Vibrations, therefore, should not interfere with the image capturing process of the camera system.

In other embodiments, inspection system 350 may include contact image sensors (CISs) for inline inspection. These sensors may help in alerting inspection system 350 when a sheet is moving through the paper path in order to capture an image for inspection.

An intermediate transfer unit 351 is provided for guiding or transporting the sheets away from impression cylinder 310 to the circumference of a downstream located inspection cylinder or drum 352. Inspection cylinder or drum 352 guides or transports the printed sheets in succession in front of and past the camera unit. Intermediate transfer unit 351 preferably designed to guide the sheets along a curved trajectory forming an arc of a circle and is configured as a rotating gripper system having at least one gripper bar for holding a leading edge of the sheet and transporting the sheet along the curved trajectory. As a rotating gripper system, intermediate transfer unit 351 is designed to take each successive sheet away from impression cylinder 310 and transfers it to the circumference of inspection cylinder or drum 352, where the leading edge of a sheet is being held by the gripper bar of the rotating gripper system.

Figure 4A:
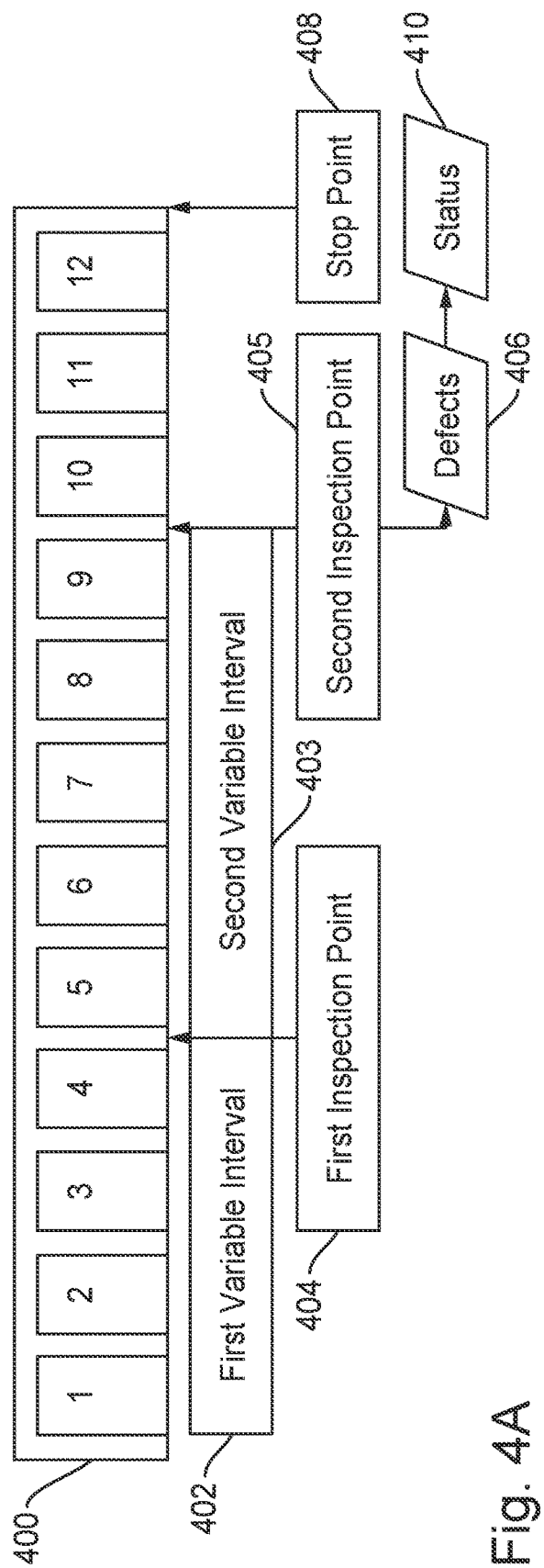
FIG. 4A illustrates variable intervals being used in detecting a defect during printing operations according to the disclosed embodiments.
Figure 4B:
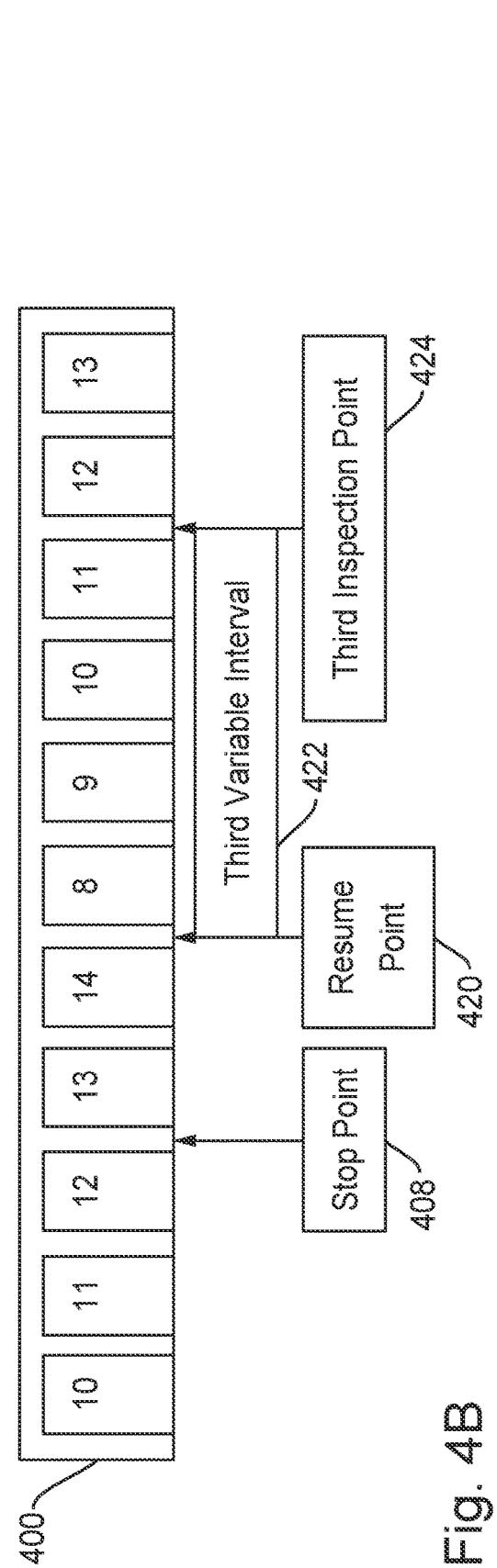
FIG. 4B further illustrates variable intervals being used in detecting the defect during printing operations according to the disclosed embodiments.

FIGS. 4A and 4B depict variable intervals 402, 403, and 422 being used in detecting a defect 406 during printing operations according to the disclosed embodiments. Printing device 104 may incorporate variable intervals 402 and 403 in performing inline inspections using inspection system 350. During printing operations, printing device 104 performs inline image inspection using inspection system 350. Inspection system 350 scans printed sheets 400 as disclosed above. It may scan one of sheets 400 at specified intervals. These intervals are variable.

For example, sheets 400 may include sheet 1, sheet 2, sheet 3, sheet 4, sheet 5, sheet 6, sheet 7, sheet 8, sheet 9, sheet 10, sheet 11, and sheet 12, shown for illustrative purposes. Additional sheets may be used within printing device 104. Sheets 400 may be for printing document 105 of print job 103. Inline inspection points occur according to variable intervals using inspection system 350. As shown, first inspection point 404 and second inspection point 405 correspond to inspection operations to evaluate a scanned sheet from sheets 400. Inspection points occur at the completion of a variable interval within printing device 104.

Using the above example, printing device 104 begins printing print job 103 and sheet 1 of sheets 400 passes through the paper path. First variable interval 402 elapses and first inspection point 404 occurs by scanning sheet 4. In this example, sheet 4 is determined to be acceptable so no action is taken. Sheet 5 is fed into the paper path and second variable interval elapses. Second inspection point 405 occurs by scanning sheet 9. At this point, defect 406 is detected and printing operations are paused.

According to the disclosed embodiments, first variable interval 402 and second variable interval 403 do not scan the same number of sheets 400. First variable interval 402 encompasses sheets 1-4 while second variable interval 403 encompasses sheets 5-9. Thus, the number of sheets 400 within first variable interval 402 is 4 sheets while the number of sheets 400 within second variable interval 403 is 5 sheets. Preferably, variable intervals are time-based as opposed to the number of sheets processed. Thus, first variable interval 402 and second variable interval 403 both may be 5 seconds in that inspection system 350 is not counting the number of sheets 400 processed but scanning sheets according to a set period of time.

This feature may reduce requirements on DFE 106 to count the number of sheets 400 between inspections points. Instead, inspection system 350 is instructed to scan a sheet at the set time for the variable intervals. The term "variable" refers to the number of sheets processed between inspection points. As it is not static, the disclosed embodiments account for job costs caused by the defect as well as provide the disclosed features in addressing defect 406 that may occur.

When defect 406 is found, inspection system 350 may instruct printing device 104 to stop printing at stop point 408. As shown, sheets 10, 11, and 12 already may be fed into the paper path to cylinders 10 and 11 before stop point 408 occurs. Printing device 104 may return a status 410 to let the operator know that he/she needs to inspect the output. Status 410 may be shown in operations panel 208 or the user interface for DFE 106. Status 410 also may be sent to any clients displaying printing device status.

Printing device 104 will stop feeding sheets 400 and will clear all sheets within the paper path to the stacker. For sheets 400 that have been fed but not printed on, printing device 104 may send these to an output bin 227 without printing on them. For example, stop point 408 may occur between sheet 12 and sheet 13 of sheets 400. Yet, the number of impacted sheets include all sheets processed within second variable interval 403. Further, sheets 8 and 9 may still be in the paper path when stop point 408 occurs. Sheets 13 and 14 also may be within the paper path. Thus, sheets 8-14 are cleared from the paper path.

Figure 4C:
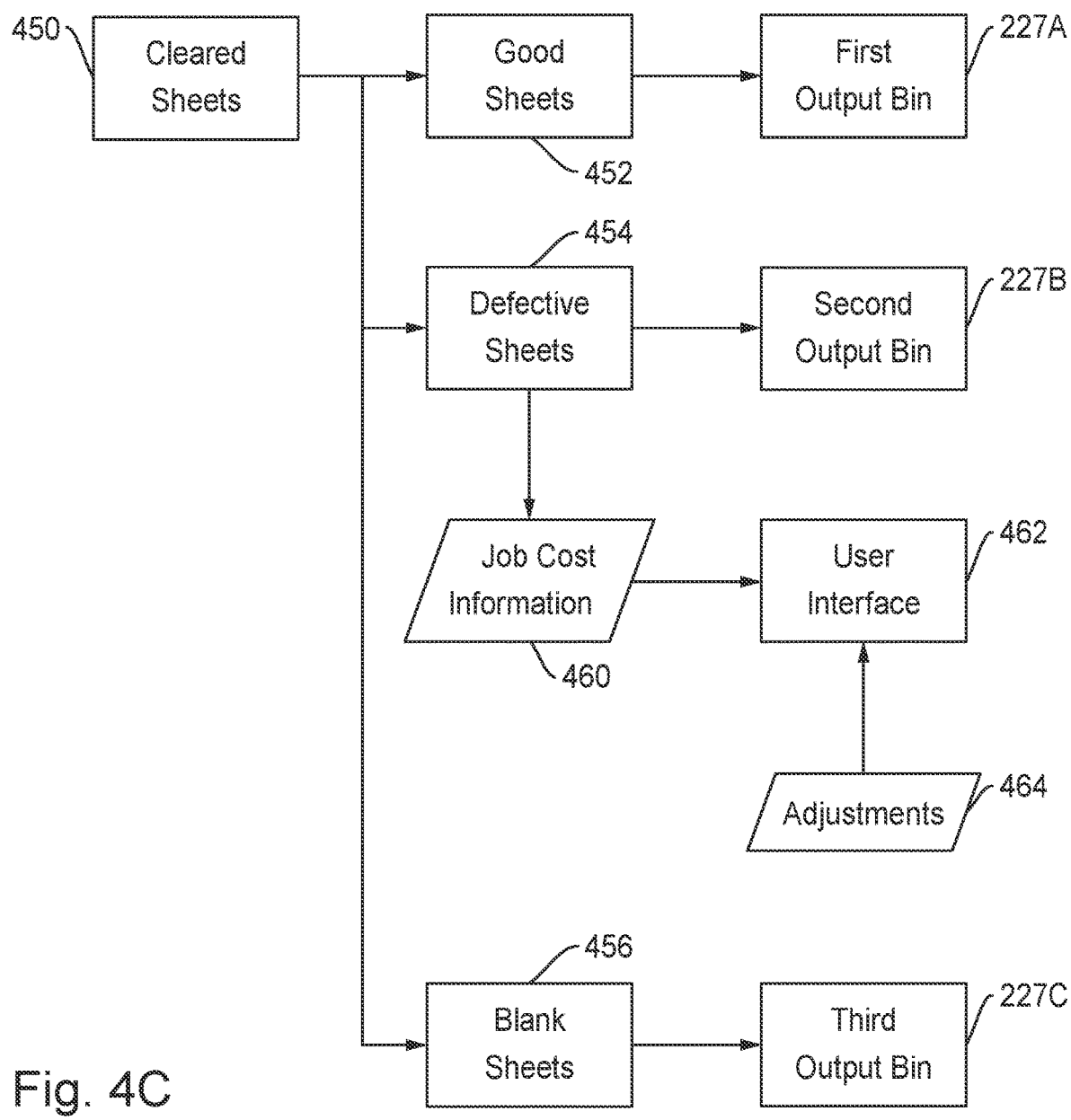
FIG. 4C illustrates a block diagram of separated cleared sheets from inspection recovery according to the disclosed embodiments.

FIG. 4C depicts a block diagram of separated cleared sheets 450 from inspection recovery according to the disclosed embodiments. Printing device 104 clears cleared sheets 450 from the paper path. As disclosed above by FIGS. 4A and 4B, sheets 8-14 are cleared. Further, some of the sheets may be acceptable, such as sheets 8 and 9 printed before defect 406 is detected. The possibly acceptable sheets are placed in a set of sheets, or good sheets 452. Good sheets 452 may be sent to first output bin 227A, if more than one output bin 227 is available at printing device 104. If not, then good sheets 452 may be sent to output bin 227.

Cleared sheets 450 also may be split into a set of defective sheets 454. These are sheets within the paper path after the detected defective sheet, shown as sheet 10. Defective sheets 454 most likely have a problem associated with the equipment malfunction that caused defect 406, such as misfiring of an inkjet of inking system 313. Defective sheets 454 include sheets 10-14. From defective sheets, blank sheets 456 may be separated from cleared sheets 450 or defective sheets 454. Blank sheets 456 are those that have no ink or toner on them and may be reused in printing operations. For example, sheets 13 and 14 may be within the paper path but not printed on as sheet 12 was the last printed sheet before stop point 408. Preferably, these sets of sheets are sent to separate output bins from good sheets 452. Thus, defective sheets 454 may be sent to second output bin 227B and blank sheets 456 to third output bin 227C.

Once the paper path is cleared, printing device 104, using DFE 106, reports relevant job cost information 460 to the operator. Sheets before the detected defective sheet may be reported as good. Thus, sheets 8 and 9 may be initially reported as good. Sheets after the defective sheet may be reported as waste. Thus, sheets 11-14 as well as defective sheet 10 may be reported as waste. These designations may be adjusted, as disclosed below. Printing device 104 may generate job cost information 460 and send it to user interface 462. User interface 462 preferably is connected to DFE 106 to communicate directly with the DFE. It may be at DFE 106 or connected to a client device, such as client terminal 102 that allows the operator to directly view information from the DFE as opposed to operations panel 208.

Job cost information 460 may include the number of sheets used. Preferably, the number of sheets is the number of defective sheets 454 but may include good sheets 452 and blank sheets 456 for reference. Job cost information 460 also may include impressions printed. For example, although sheets 8-14 are cleared from printing device 104, only one or two impressions were used for processing these sheets. In other embodiments, a distinct impression may have been used for each sheet. Job cost information 460 also includes consumable use for processing and printing defective sheets 454. Consumable use may include ink use or toner use.

Other actions that printing device 104 may take is lowering one or more output bins 227A, 227B, and 227C. This may allow the operator to quickly remove the paper stacks from the respective output bin. Printing device 104 also may let DFE 106 know the impression on which defect 406 was found. DFE 106 may suspend the active print job and flag it as requiring input from the operator before printing operations continue, such as through user interface 462. DFE 106 also may adjust the page range from print job 103 so that it resumes printing from the impression on which defect 406 was found.

Once printing device 104 stops printing, the operator may perform maintenance or other actions to repair the equipment malfunction. For example, the operator may perform actions to unclog the printhead or repair a clogged inkjet in inking system 313. After performing the maintenance, printing device 104 may report with job cost information 460 the printing done to unclog the print heads, such as sheets, impressions, ink or toner. Further, it may account for any ink used in printhead cleaning. The actions may be taken multiple times until the problem is resolved. Once printing device 104 exits maintenance, DFE 106 will aggregate job cost information from the maintenance operations and track that is separate job cost information 460.

After curing defect 406, printing device 104 will resume printing operations. Print job 103, currently, suspended, will resume printing, but, however, not automatically. Instead, DFE 106 will show in user interface 462 where the operator can review and adjust the resumption point. User interface 462 may initially be set to where defect 406 was detected. Using the above examples, resume point 420 may initially be set for sheet 10, or where second inspection point 405 occurred. User interface 462 will prompt the operator to review the output stacks of good sheets 452 and defective sheets 454 to determine the last good sheet. The last good sheet may differ from the sheet on which defect 406 was detected because inspection system 350 does not check every sheet.

Once the operator inspects good sheets 452 and defective sheets 454, the operator determines the last good sheet and may adjust resume point 420 accordingly. Thus, adjustments 464 may be made to resume point 420 as well as the number of good sheets 452 and defective sheets 454. Adjustments 464 may be made a few different ways. One is where user interface 462 shows the operator a preview of the page that will print next and the pages before and after this page. The operator may scroll back to previous pages until he/she finds the first defective page. The operator may select the preview to adjust the page from which to resume printing. The operator may additionally specify the number of bad sets or sheets in the stack of defective sheets 454. This method may be best for print jobs with a small number of pages, such as printing 100 copies of a 40 page brochure.

Another method for making adjustments 464 to resume point 420 is using user interface 462 to allow the operator to specify the number of defective sheets 454 on the stack. User interface 462 may adjust the previews to show the impression on the front of the first defective sheet. Because this may take some time for large print jobs, the operator may suspend the print job so that other print jobs print while the operator determines the page from which to resume printing. This method may be best for transactional jobs for which integrity is critical and for which minimizing waste sheets is important, such as printing credit card statements.

If either jogging or slip sheets are enabled for print job 103, then user interface 462 may allow the operator to specify the number of defective segments. Referring to FIGS. 4A and 4B, sheets 400 may be known as segments 400 in that defective segments are detected by inspection system 350. User interface 462 will adjust the previews to show the front of the first sheet on the first defective segment. A segment may be defined as all the sheets or pages within an offset block or all the sheets or pages between two slip sheets. Because the operator only needs to count segments, he/she can quickly find resume point 420. This method may be preferable for large print jobs for which the amount of waste is not critical, such as printing personalized marketing mailers.

In all cases, the operator may use the sheet preview to validate that resume point 420 is at the expected location. Once the operator adjusts resume point 420, print job 103 will resume printing normally. DFE 106 will adjust the good versus defective job cost information based on how resume point 420 is adjusted.

For example, using the disclosure above, user interface 462 sets resume point 420 to begin printing at sheet 10, which corresponds to the first defective sheet detected by inspection system 350. The operator, however, inspects good sheets 452 and finds that sheets 8 and 9 also are defective. The defect began to occur before sheet 10. The operator makes adjustments 464 using user interface 462 to move resume point 420 to start with sheet 8. Alternatively, resume point 420 is moved to start with the impression associated with the original sheet 8.

After resuming printing operations, third variable interval 422 is used to determine third inspection point 424 to resume inspection of sheets are they are printed. Third variable 422 is based on the time period for inspections, and not tied to the number of sheets processed. Thus, third inspection point 424 may occur to scan sheet 11 after printing operations resume. Once print job 103 completes by printing one or more documents 105, printing device 104 will report job cost information 460 for the resumed portion of the print job. DFE 106 may aggregate this information with the previous job cost information and stores the combined information for print job 103. This information may be provided to estimation system 108 for verification and updating estimation processes.

FIG. 5 depicts a flowchart 500 for enhanced print inspection recovery according to the disclosed embodiments. Flowchart 500 may refer to FIGS. 1A to 4C for illustrative purposes. Flowchart 500, however, is not limited to the embodiments disclosed by FIGS. 1A to 4C.

Step 502 executes by performing printing operations at printing device 104. Sheets 400 may be fed through a paper path created by cylinders 10 and 11. Sheets are printed and finished for print job 103. Step 504 executes by executing a variable interval for inspection operations. Referring to FIGS. 4A and 4B, multiple variable intervals may be used to initiate inspection points. For example, the variable intervals may correspond to a period of time between inspection points, in which a sheet is scanned by inspection system 350. The variable interval, for example, may occur every 5 or 10 seconds and is not tied to the number of sheets processed. Alternatively, the variable interval may be set by the number of sheets processed. The disclosed embodiments do not scan every sheet printed for inspection.

Step 505 executes by inspecting a printed sheet for defects at an inspection point by inspection system 350. For example, after first variable interval 402 elapses, first inspection point 404 causes inspection system 350 to capture an image of the last printed sheet, or sheet 4. Inspection system 350 then reviews sheet 4 for any possible defects. If no defects are found, then flowchart 500 returns to step 504 to execute the next variable interval. If defects are found, then step 506 executes by analyzing defect 406 within the inspected sheet.

Step 508 executes by determining the number of sheets 400 currently in the paper path of printing device 104 based on the scanned defective sheet and the variable interval. The number of sheets includes the defective sheet plus any sheets within the processed within the variable interval. It also may include sheets from another variable interval but still within the paper path. Step 510 executes by removing the number of sheets, or cleared sheets 450, from the paper path in printing device 104. Further, printing operations may be stopped.

Step 512 executes by determining a set of good sheets 452 from cleared sheets 450. Good sheets 452 may include those sheets printed before the detected defective sheet, at least initially. Using the example above, if the detected defective sheet is sheet 10, then sheets 8 and 9, which are still in the paper path, may be placed in good sheets 452. Step 514 executes by determining a set of defective sheets 454. Initially, defective sheets 454 includes the sheets in the paper path including all sheets printed since within the variable interval and from when the defective sheet was printed. Step 516 executes by determining a set of blank sheets 456 from cleared sheets 450. Blank sheets 456 may be those sheets in the paper path, but not yet printed on.

Step 518 executes by generating job cost information 460 from defective sheets 454 for waste in performing printing operations on sheets that will not be used. As disclosed above, job cost information 460 may include sheets used, impressions printed, and any ink or toner used by printing device 104. Step 520 executes by sending the sets of sheets to any applicable output bin. For example, good sheets 452 may be sent to first output bin 227A, defective sheets 454 to second output bin 227B, and blank sheets 456 to third output bin 227C. The different output bins allow the operator to review the sheets for adjusting the number of defective sheets. It also allows more than one operator to start on inspection recovery for large print jobs on production printing devices.

FIG. 6 depicts a flowchart 600 for adjusting resume point 420 during inspection recovery operations according to the disclosed embodiments. Flowchart 600 may refer to FIGS. 1A to 5 for illustrative purposes. Flowchart 600, however, is not limited to the embodiments disclosed in flowchart 600.

Step 602 executes by reviewing cleared sheets 450. Preferably, the operator will review good sheets 452 and defective sheets 454. As disclosed above, these may be sent to separate output bins at printing device 104. In reviewing the sheets, the operator may determine when the equipment malfunction started and which sheet is actually printed correctly.

Step 604 executes by performing equipment maintenance at printing device 104. In performing the maintenance, additional resources or consumables may be used. DFE 106 and printing device 104 accounts for these additional resources and consumables during the maintenance operations.

Step 606 executes by automatically displaying resume point 420 for print job 103. DFE 106 will show in user interface 462 where in the printing operations that the last good sheet is located. The last good sheet may be set to the sheet on which defect 406 is detected. Step 608 executes by determining the actual last good sheet printed before defect 406 occurred. The operator, in step 602, may determine that defect 406 occurred earlier than the displayed last good sheet. In this instance, the last good sheet should be adjusted.

Step 610 executes by adjusting the last good sheet using user interface 462 connected to DFE 106. As disclosed above, the operator may adjust resume point 420 according to a few different methods. The operator may scroll or input information to adjust where the last good sheet occurred.

Step 611 executes by suspending print job 103 while steps 602-610 are being performed. Step 611 may execute at any time after printing operations are stopped due to detection of defect 406. Step 612 executes by processing a subsequent print job at printing device 104. As the operator is reviewing sheets and doing other tasks, a subsequent print job may be processed at printing device 104 so that the printing device is not sitting idle and time is not being wasted. Once the equipment malfunction is addressed, there is no need to continue to pause printing operations. Downtime also loses money for the print shop. When the operator determines and adjusts the last good sheet for resuming print job 103, the subsequent print job may be paused until print job 103 is complete.

Step 614 executes by resuming printing operations of print job 103 at the last good sheet, as determined above. Step 616 executes by updating job cost information 460 for handling defect 406 with the resources and consumables used to resolved the equipment malfunction. DFE 106 may aggregate job cost information 460 with previous job cost information and store the combined information for print job 103. Printing device 104 may report job cost information 460 for handling defect 406 to estimation system 108.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for print inspection recovery operations, the method comprising:
   detecting a defect on a scanned sheet of a print job being printed within a printing device, wherein the scanned sheet is inspected within a variable interval;
   determining a number of sheets within a paper path of the printing device based on the scanned sheet;
   removing the number of sheets from the paper path;
   determining a set of defective sheets within the number of sheets;
   determining an amount of a consumable to correct the defect within the printing device;
   generating job cost information for the set of defective sheets.

2. The method of claim 1, further comprising sending the set of defective sheets to a first output bin.

3. The method of claim 2, further comprising determining a set of good sheets from the number of sheets.

4. The method of claim 1, further comprising adjusting a range for the number of sheets.

5. The method of claim 1, further comprising adjusting a range for the set of defective sheets.

6. The method of claim 5, further comprising updating the job cost information based on the adjusted range for the set of defective sheets.

7. The method of claim 1, further comprising adding the amount of the consumable to the job cost information.

8. A method for print inspection recovery operations, the method comprising:
   detecting a defect on a scanned sheet of a print job being printed within a printing device, wherein the scanned sheet is inspected within a variable interval;
   determining a number of sheets within a paper path of the printing device based on the scanned sheet;
   identifying the number of sheets from the paper path;
   determining a set of defective sheets within the number of sheets;
   determining a set of good sheets within the number of sheets;
   sending the set of defective sheets to a first output bin of the printing device;
   lowering the first output bin with the set of defective sheets; and
   sending the set of good sheets to a second output bin of the printing device.

9. The method of claim 8, further comprising determining an impression related to the scanned sheet.

10. The method of claim 8, further comprising generating job cost information from the set of defective sheets and the set of good sheets.

11. The method of claim 8, further comprising adjusting the set of defective sheets using a user interface connected to a digital front end of the printing device.

12. A method for recovering from an equipment malfunction defect at a printing device, the method comprising:
   detecting a defect on a scanned sheet of a print job being printed within a printing device, wherein the scanned sheet is inspected within a variable interval;
   determining a number of sheets within a paper path of the printing device based on the scanned sheet;
   removing the number of sheets from the paper path;
   determining a set of defective sheets within the number of sheets;

adjusting a first sheet of the set of defective sheets using a user interface at the printing device, wherein adjusting the first sheet includes scrolling through the number of sheets for the variable interval; and resuming printing of the print job at the first sheet.

13. The method of claim 12, further comprising generating job cost information based on the first sheet of the set of defective sheets.

14. The method of claim 12, wherein adjusting the first sheet includes determining an impression for the scanned sheet.

15. The method of claim 12, wherein adjusting the first sheet includes selecting a segment of the number of sheets.

16. The method of claim 12, further comprising processing a subsequent print job while adjusting the first sheet.

* * * * *